United States Patent Office 3,164,586
Patented Jan. 5, 1965

3,164,586
TRINUCLEAR CYANINE DYES
Geoffrey Ernest Ficken, Ilford, Essex, England, assignor to Ilford Limited, Ilford, Essex, England, a British company
No Drawing. Filed Feb. 7, 1962, Ser. No. 171,598
Claims priority, application Great Britain, Feb. 16, 1961, 5,827/61; May 31, 1961, 19,701/61; June 14, 1961, 21,473/61
11 Claims. (Cl. 260—240.1)

This invention relates to cyanine dyes and to the production and use thereof.

In accordance with the present invention there are provided cyanine dyes of the general formula:

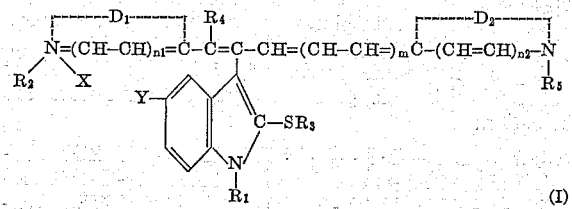

(I)

wherein $R_1$ is an alkyl group or an aryl group, $R_3$ is an alkyl group containing up to 6 carbon atoms and further containing a carboxylic acid, sulphonic acid, sulphuric acid, hydroxy, alkoxy, acyloxy, alkoxycarbonyl, cyano, amino, alkyl-substituted amino, or carbamoyl group, $R_4$ is hydrogen or an alkyl group, $R_2$ and $R_5$ are each an alkyl, hydroxyalkyl or aralkyl group, $n1$ and $n2$ are each nought or one, $m$ is nought or one, X is an acid radical, Y is hydrogen or an alkoxy group, and $D_1$ and $D_2$ are each the residue of a five-membered or six-membered heterocyclic nitrogen nucleus, and corresponding dyes of the said formula but in which the X radical and a hydrogen atom of a sulphonic, sulphuric or carboxylic group contained in $R_3$ are eliminated, and corresponding acid addition salts of these dyes in which $R_3$ carries an amino group.

In the foregoing formula the alkyl groups are preferably methyl, ethyl, propyl or butyl, suitable hydroxyalkyl groups are β-hydroxyethyl, γ-hydroxypropyl and βγ-dihydroxypropyl, and a suitable aralkyl group is benzyl.

$D_1$ and $D_2$ may each be the residue of any five-membered or six-membered heterocyclic ring system including thiazoles, oxazoles, selenazoles and their polycyclic homologues such as those of the benzene and naphthalene series; pyridine and its polycyclic homologues, such as quinoline and α- and β-naphthoquinolines; indolenines; diazoles (e.g. 1:3:4-thiadiazole); thiazolines; diazines (e.g. pyrimidines and quinazolines). The polycyclic compounds of the series may be substituted in the carbocyclic rings with one or more groups such as alkyl, aryl, alkoxy and methylene dioxy groups, or by halogen atoms.

X may be any acid radical, for example halide (chloride, bromide, iodide), sulphate, sulphamate, perchlorate or p-toluene sulphonate.

The foregoing compounds of Formula I and those in which HX has been eliminated are valuable sensitisers for photographic silver halide emulsions and may be used in that connection in quantities similar to, and by methods similar to, those well known in the art for the sensitising of photographic emulsions with cyanine dyes.

According to a further feature of the invention the compounds of general Formula I are prepared by reacting a compound of general Formula II:

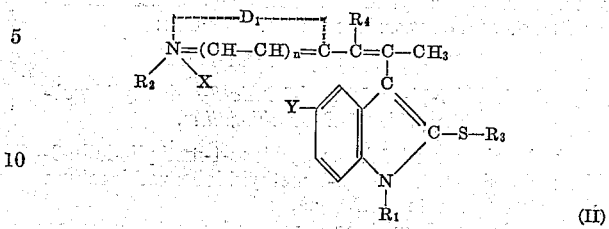

(II)

with a compound of the general Formula III:

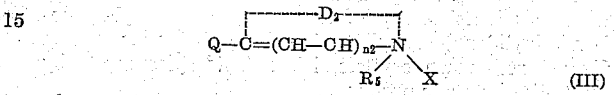

(III)

where Q is a thioether (SR), thioether vinyl $$(-CH=CH-SR)$$

or acetanilidovinyl group and R is an alkyl group containing up to 6 carbon atoms.

Instead of using a compound of Formula III there may be used a corresponding base together with a stoichiometric quantity of a quaternary salt $R_5X$.

The foregoing condensations are most conveniently effected by heating the reagents together in the presence of a basic condensing agent, e.g. pyridine, piperidine, triethylamine, or sodium acetate.

The starting materials of general Formula II may be made by several methods, e.g.

(a) Reacting a compound of the general Formula IV:

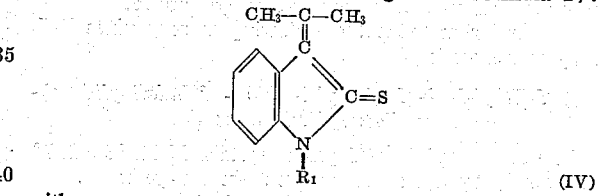

(IV)

with a compound of general Formula V:

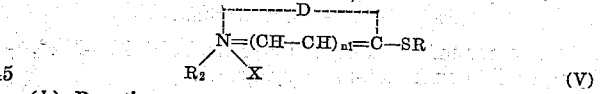

(V)

(b) Reacting a compound of general Formula VI:

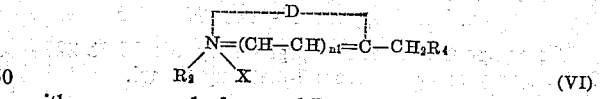

(VI)

with a compound of general Formula VII:

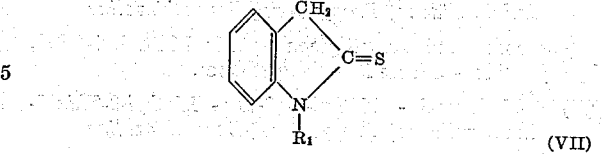

(VII)

and an orthoacetate of the Formula VIII:

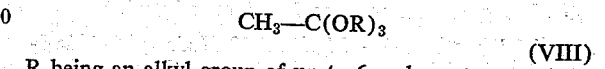

$$CH_3-C(OR)_3$$

(VIII)

R being an alkyl group of up to 6 carbon atoms and the other symbols having the meanings assigned to them above, or (c) Reacting a compound of the Formula IX:

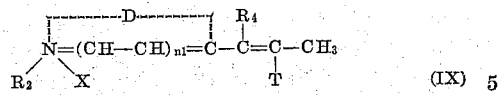

where T is a thioether or substituted amino group, with a compound of general formula VII above, each of the foregoing steps being followed by treatment of the product with a quaternating agent $R_3Z$, where Z is a halogen atom, e.g. chlorine or bromine.

The following are illustrative procedures for the production of the products (referred to as primary intermediates) which, after quaternation with $R_3Z$ as referred to above, yield the intermediates used in the production of the dyes of the present invention:

PRIMARY INTERMEDIATES (A) *3-Methyl-2-[2-(1-Methyl-2-Thio-3-Indolinylidene)- Propylidene]-Benzothiazoline.*

(a) A mixture of 3-isopropylidene-1-methylindolin-2-thione (0.96 g), 3-methyl-2-methylthiobenzothiazolium toluene-p-sulphonate (1.70 g.), ethanol (20 ml.) and triethylamine (1.0 ml.) was refluxed for 30 minutes. The solid which separated was collected and washed with hot ethanol to leave 3-methyl-2-[2-(1-methyl-2-thio-3-indolinylidene)-propylidene] - benzothiazoline, which formed red-brown crystals, M.Pt. 274° (decomp.), by crystallisation from pyridine.

(b) Ethyl orthoacetate (18 ml.) was added to a boiling solution of 2,3-dimethylbenzothiazolium toluene-p-sulphonate (16.8 g.) and 1-methylindolin-2-thione (8.2 g.) in pyridine (50 ml.), and the whole was refluxed for 30 minutes. The solid which separated was filtered off and washed with hot ethanol. The product was identical with that obtained in (a) above.

(c) 3-methyl - 2 - thioacetylmethylenebenzothiazoline (2.2 g.) and methyl toluene-p-sulphonate (1.9 g.) were fused together on the steam bath for 30 minutes. The product was refluxed with 1-methylindolin-2-thione (1.6 g.) in ethanol (10 ml.) containing triethylamine (1.5 ml.) for one hour, and the solid which separated was collected and washed with hot ethanol. The product was identical with that described in (a) above.

By similar methods the following merocyanines B–L may be prepared:

(B) *3-Ethyl-2-[2-(1-Methyl-2-Thio - 3-Indolinylidene)- Propylidene]-Benzothiazoline*

The compound formed green crystals, M.Pt. 235–237° (decomp.), by crystallisation from 2-methoxyethanol.

(C) *3-Ethyl-2-[2-(1-Ethyl - 2-Thio-3 - Indolinylidene)- Propylidene]-Benzothiazoline*

The compound formed green crystals, M.Pt. 233–234°, by crystallisation from 2-methoxyethanol.

(D) *5-Chloro-3-Methyl-2-[2 - (1-Methyl-2-Thio-3-Indo- linylidene-Propylidene]-Benzothiazoline*

The compound formed deep green crystals, M.Pt. 228–229°, by crystallisation from 2-methoxyethanol.

(E) *5-Methoxy-3 - Methyl-2-[2-(1 - Methyl-2-Thio-3- Indolinylidene)-Propylidene]-Benzothiazoline*

The compound formed green crystals, M.Pt. 254–255°, by crystallisation from 2-methoxyethanol.

(F) *6-Methoxy-3 - Methyl-2-[2-(1 - Methyl-2-Thio-3- Indolinylidene)-Propylidene]-Benzothiazoline*

The compound formed deep green crystals, M.Pt. 234–235°, by crystallisation from 2-methoxyethanol.

(G) *5,6-Dimethoxy-3 - Methyl-2-[2-(1Methyl-2-Thio-3- Indolinylidene)-Propylidene]-Benzothiazoline*

The compound formed bronze-coloured crystals, M.Pt. 267°, by crystallisation from 2-methoxyethanol.

(H) *3-Ethyl-5,6-Dimethyoxy - 2-[2-(1-Methyl-2-Thio-3- Indolinylidene)-Propylidene]-Benzothiazoline*

The compound formed deep purple crystals, M.Pt. 235–236°, by crystallisation from 2-methoxyethanol.

(I) *3-2' - Hydroxyethyl - 2 - [2-(1-Methyl-2-Thio-3- Indolinylidene)-Propylidene]-Benzothiazoline*

The compound formed deep purple crystals, M.Pt. 219–222°, by crystallisation from 2-methoxyethanol.

(J) *3,5 - Dimethyl-2-[2-(1 - Methyl-2-Thio-3-Indolinyli- dene)Propylidene]-Benzoselenazoline*

The compound formed purple crystals, M.Pt. 274–275°, by crystallisation from pyridine.

(K) *3-Ethyl-5-Methyl-2-[2-(1-Methyl-2-Thio-3- Indolinylidene)Propylidene]-Benzoselenazoline*

The compound formed green crystals, M.Pt. 242–243°, by crystallisation from 2-methoxyethanol.

(L) *1-Methyl-2-[2-(1-Phenyl-2 - Thio-3-Indolinylidene)- Propylidene]-Benzothiazoline*

The compound formed purple crystals, M.Pt. 236–238°, by crystallisation from 2-methoxyethanol.

The quaternisation of the foregoing intermediates is illustrated in the examples which follow later herein.

The following examples, in which the temperatures are given in degrees centigrade, and in which the utility of the end products in the sensitising of photographic silver halide emulsions is given, will serve to illustrate the invention:

EXAMPLE 1.—BIS - (3 - METHYL - 2 - BENZOTHIA- ZOLE) β-(2-2'-HYDROXYETHYLTHIO - 1 - METH- YL - 3 - INDOLYL) - TRIMETHINCYANINE BRO- MIDE

A mixture of 3-methyl-2-[2-(1-methyl-2-thio-3-indolinylidene)-propylidene]-benzothiazoline (0.60 g.), 2-bromo-ethanol (0.15 ml.) and chloroform (10 ml.) was refluxed for 21 hours. Evaporation of the solution and stirring the residue with dry ether gave a red powder. This was refluxed with 3-methyl-2-methylthiobenzothiazolium toluene-p-sulphonate (0.60 g.) in ethanol (10 ml.) containing triethylamine (0.3 ml.) for 30 minutes. The dye which separated was filtered off and was washed with cold ethanol. Crystallisation from 2-methoxyethanol gave the dye as green crystals, M. Pt. 287–288° (decomp.).

The dye extends the sensitivity of a silver iodobromide photographic emulsion to 6550 A. with a maximum at 6400 A.

EXAMPLE 2.—(3-METHYL - 2 - BENZOTHIAZOLE) (5,6-DIMETHOXY - 3 - METHYL - 2-BENZOTHIA- ZOLE β-(2-CYANOMETHYLTHIO - 1 - METHYL-3- INDOLYL)-TRIMETHINCYANINE IODIDE

A mixture of 3-methyl-2-[2-(1-methyl-2-thio-3-indolinylidene) - propylidene] - benzothiazoline (0.58 g.), iodoacetonitrile (0.30 g.) and chloroform (20 ml.) was refluxed for 20 minutes, and the solution was evaporated to dryness. The resulting solid was refluxed in ethanol (10 ml.) with 5,6-dimethoxy - 3 - methyl - 2 - methylthiobenzothiazolium iodide (0.65 g.) and triethylamine (0.3 ml.) for 30 minutes. The dye, which separated on cooling the solution, was filtered off and crystallised from methanol. It formed purple crystals, M. Pt. 211–212°.

The dye extends the sensitivity of a silver iodobromide photographic emulsion to 6750 A. with a maximum at 6500 A.

EXAMPLE 3.—(3-METHYL - 2 - BENZOTHIAZOLE) (5,6-DIMETHOXY - 3 - METHYL - 2-BENZOTHIA- ZOLE)β-(2-2'-CYANOETHYLTHIO - 1-METHYL-3- INDOLYL)-TRIMETHINCYANINE IODIDE

A mixture of 5,6-dimethoxy-3-methyl-2-[2-(1-methyl-2-thio-3-indolinylidene) - propylidene]-benzothiazoline (0.7 g.), β-bromopropionitrile (0.3 g.) and chloroform (25 ml.) was refluxed for 16 hours, and the resulting solution was evaporated to dryness. The product was refluxed for 30 minutes in ethanol (20 ml.) with 3-methyl-2-methylthiobenzothiazolium toluene-p-sulphonate (0.8 g.) and triethylamine (0.3 ml.). Addition of aqueous potassium iodide solution caused the separation of the dye, which was collected and crystallised from methanol, when it formed deep purple crystals, M. Pt. 201–203°.

The dye extends the sensitivity of a silver iodobromide photographic emulsion to 6650 A. with a maximum at 6450 A.

EXAMPLE 4.—(3-ETHYL - 2-BENZOTHIAZOLE)(3-ETHYL-5,6-DIMETHOXY - 2 - BENZOTHIAZOLE) β - (2 - 2' - HYDROXYETHYLTHIO - 1 - METHYL-3-INDOLYL) - TRIMETHINCYANINE PERCHLORATE 3-ethyl-5,6-dimethoxy - 2 - [2-(1-methyl-2-thio-3-indolinylidene)-propylidene]-benzothiazoline (0.7 g.) and 2-bromoethanol (0.15 ml.) were refluxed together in chloroform (25 ml.) for 15 hours. Evaporation of the solution gave a sticky solid, which was refluxed for 45 minutes in ethanol (25 ml.) with 3-ethyl-2-ethylthiobenzothiazolium toluene-p-sulphonate and triethylamine (0.3 ml.). Addition of an aqueous solution of sodium perchlorate caused the separation of the dye, which was obtained as purple crystals, M. Pt. 147–149°, by crystallisation from methanol.

The dye extends the sensitivity of a silver iodobromide photographic emulsion to 6450 A. with a maximum at 6100 A.

EXAMPLE 5.—BIS-(5,6-DIMETHOXY-3-METHYL-2-BENZOTHIAZOLE) β-(2-2'-ETHOXYETHYLTHIO-1-METHYL-3-INDOLYL) - TRIMETHINCYANINE IODIDE

A mixture of 5,6-dimethoxy-3-methyl-2-[2-(1-methyl-2-thio-3-indolinylidene) - propylidene] - benzothiazoline (0.7 g.), β-ethoxyethyl bromide (0.3 g.) and 2-methoxyethanol (10 ml.) was refluxed for 2½ hours. The solvent was evaporated under reduced pressure, and the residue was refluxed for one hour in ethanol (20 ml.) with 5,6-dimethoxy - 3 - methyl - 2 - methylthiobenzothiazolium toluene-p-sulphonate (0.9 g.) and triethylamine (0.5 ml.). Addition of aqueous potassium iodide solution caused the separation of the dye, which was obtained as deep purple crystals, M. Pt. 190–192°, by crystallisation from methanol.

The dye extends the sensitivity of a silver iodobromide photographic emulsion to 6800 A. with a maximum at 6650 A.

The dyes of Examples 6 to 23 were prepared by methods similar to those described in Examples 1 to 5, the results being collected in Table 1. In each case a merocyanine (the letters given in the first column of the table refer to primary intermediates A–L) was reacted with one of the following quaternising agents:

| | |
|---|---|
| 2-bromoethanol | $R_3$= —$CH_2.CH_2OH$ |
| 1-bromopropan-2-ol | —$CH_2.CH(OH)CH_3$ |
| 3-iodopropan-1-ol | —$CH_2.CH_2.CH_2.OH$ |
| 1,2-dihydroxy-3-iodopropane | —$CH_2.CH(OH)CH_2OH$ |
| 2-ethoxyethyl bromide | —$CH_2.CH_2.O.C_2H_5$ |
| 2-iodoethyl acetate | —$CH_2.CH_2.O.CO.CH_3$ |
| Ethyl bromoacetate | —$CH_2.CO_2C_2H_5$ |
| β-Iodopropionamide | —$CH_2.CH_2.CONH_2$ |
| β-Bromopropionitrile | —$CH_2.CH_2.CN$ |

The resulting quaternary salt was reacted with an alkylthioheterocyclic quaternary salt to give the dye. All of the dyes in Table 1 possess the structure of general Formula X:

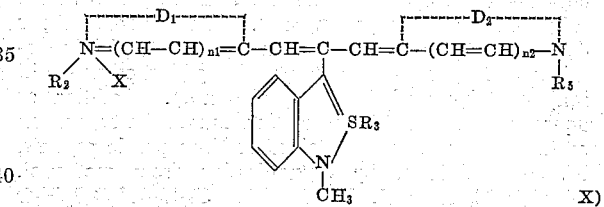

TABLE 1

[The letter following the example number indicates the merocyanine used. The anion of the salt obtained is indicated in the column of melting points]

| Example | End Groups | | $R_3$ | M.Pt., °C. | Sensitising A | |
|---|---|---|---|---|---|---|
| | | | | | Extent | Max. |
| 6A | 3-methyl-2-benzothiazole | 5,6-dimethoxy-3-methyl-2-benzothiazole. | —$CH_2.CH_2OH$ | 225–226 (I) | 6,650 | 6,500 |
| 7B | 3-ethyl-2-benzothiazole | 3-ethyl-2-benzothiazole | —$CH_2.CO_2Et$ | 182–183 (ClO$_4$) | 6,400 | 6,150 |
| 8E | 5-methoxy-3-methyl-2-benzothiazole. | 5-methoxy-3-methyl-2-benzothiazole. | —$CH_2$—$CH_2OH$ | 284–286 (Br) | 6,750 | 6,600 |
| 9F | 6-methoxy-3-methyl-2-benzothiazole. | 6-methoxy-3-methyl-2-benzothiazole. | —$CH_2.CH_2OH$ | 227–230 (I) | 6,500 | 6,300 |
| 10G | 5,6-dimethoxy-3-methyl-2-benzothiazole. | 3-methyl-2-benzothiazole | —$CH_2.CH_2.CH_2OH$ | 209–211 (I) | 6,700 | 6,500 |
| 11G | do | do | —$CH_2.CH(OH).CH_3$ | 214–215 (I) | 6,700 | 6,500 / 5,800 |
| 12G | do | do | —$CH_2.CH(OH).CH_2OH$ | 199–200 (I) | 6,700 | 6,150 / 6,500 |
| 13G | do | do | —$CH_2.CH_2OC_2H_5$ | 199–202 (I) | 6,600 | 6,500 |
| 14G | do | do | —$CH_2.CH_2OCOCH_3$ | 166–168 (I) | 6,550 | 6,450 |
| 15G | do | do | —$CH_2.CH_2.CONH_2$ | 214–217 (I) | 6,500 | 6,100 |
| 16G | do | 5,6-dimethoxy-3-methyl-2-benzothiazole. | —$CH_2.CH_2OH$ | 266–267 (I) | 7,000 | 6,800 |
| 17G | do | do | —$CH_2.CH_2.CH_2OH$ | 229–232 (I) | 6,900 | 6,600 / 6,800 |
| 18G | do | do | —$CH_2.CH(OH).CH_2OH$ | 250–252 (I) | 6,500 | 5,800 / 6,200 |
| 19G | do | do | —$CH_2.CH_2.OCOCH_3$ | 196–198 (I) | 6,800 | 6,650 |
| 20G | do | do | —$CH_2.CH_2.CONH_2$ | 206–208 (I) | 6,900 | 5,950 / 6,300 |
| 21G | do | do | —$CH_2.CH_2.CN$ | 197–200 (I) | 7,000 | 6,600 / 6,750 |
| 22H | 3-ethyl-5,6-dimethoxy-2-benzothiazole. | 3-ethyl-5,6-dimethoxy-2-benzothiazole. | —$CH_2.CH_2OH$ | 203–205 (I) | 6,650 | 6,300 |
| 23J | 3,5-dimethyl-2-benzoselenazole. | 5,6-dimethoxy-3-methyl-2-benzothiazole. | —$CH_2.CH_2OH$ | 223–224 (I) | 6,700 | 6,550 |

The following two Examples 24 and 25 were prepared similarly from 1-methyl-2-[2-(1-phenyl-2-thio-3-indolinylidene)-propylidene]-benzothiazoline.

EXAMPLE 24.—BIS - (3 - METHYL - 2 - BENZOTHIAZOLE) - β - (2 - 2' - HYDROXYETHYLTHIO - 1 - PHENYL - 3 - INDOLYL) - TRIMETHINCYANINE BROMIDE

The dye formed green crystals, M. Pt. 276–277° (decomp.) by crystallisation from methanol.

The dye extends the sensitivity of a silver iodobromide photographic emulsion to 6550 A. with a maximum at 6350 A.

EXAMPLE 25.—(3 - METHYL - 2 - BENZOTHIAZOLE)(5,6 - DIMETHOXY - 3 - METHYL - 2 - BENZOTHIAZOLE)β - (2 - 2' - HYDROXYETHYLTHIO - 1 - PHENYL - 3 - INDOLYL) - TRIMETHINCYANINE BROMIDE

The dye formed green crystals, M. Pt. 225–226°, by crystallisation from methanol.

The dye extends the sensitivity of a silver iodobromide photographic emulsion to 6650 A. with a maximum at 6400 A.

EXAMPLE 26.—BIS - (5 - METHOXY - 3 - METHYL - 2 - BENZOTHIAZOLE)β - (2 - 2' - DIETHYLAMINOETHYLTHIO - 1 - METHYL - 3 - INDOLYL) - TRIMETHINCYANINE IODIDE

A mixture of 5-methoxy-3-methyl-2-[2-(1-methyl-2-thio - 3 - indolinylidene) - propylidene] - benzothiazoline (0.6 g.) and β-diethylaminoethyl bromide hydrobromide (0.6 g.) was refluxed for 4 hours in chloroform (40 ml.) containing triethylamine (0.3 ml.). Evaporation of the solution left a sticky yellow solid. This was refluxed for 45 minutes with 5-methoxy-3-methyl-2-methylthiobenzothiazolium toluene-p-sulphonate (0.7 g.) in ethanol (15 ml.) containing triethylamine (0.4 ml.). Addition of aqueous potassium iodide solution caused the separation of the dye, which was obtained as deep purple crystals, M. Pt. 186–189°, by crystallisation from methanol. (Found: C, 53.9; H, 4.9; I, 15.8. $C_{36}H_{41}IN_4O_2S_3.H_2O$ requires C, 53.9; H, 5.4; I, 15.8%.)

The dye extends the sensitivity of a silver iodobromide photographic emulsion to 6750 A., with maxima at 6100 and 6600 A.

EXAMPLE 27. — (3-METHYL-2-BENZOTHIAZOLE)-(5.6-DIMETHOXY-3-METHYL - 2 - BENZOTHIAZOLE)β-(2 - 2' - DIETHYLAMINOETHYLTHIO-1-METHYL - 3 - INDOLYL)-TRIMETHINCYANINE IODIDE HYDRIODIDE

A mixture of 5,6-dimethoxy-3-methyl-2-[2-(1-methyl-2-thio - 3 - indolinylidene)-propylidene]-benzothiazoline (0.70 g.), β-diethylaminoethyl bromide hydrobromide (0.60 g.), chloroform (20 ml.) and triethylamine (0.3 ml.) was refluxed for 30 minutes. The solid obtained by evaporation of the solution was refluxed for 30 minutes in ethanol (10 ml.) with 3-methyl-2-methylthiobenzothiazolium toluene-p-sulphonate (0.8 g.) and triethylamine (0.3 ml.). Addition of aqueous potassium iodide solution caused the separation of the dye, which was filtered off and crystallised from methanol, when it was obtained as bronze-coloured crystals, M. Pt. 271–272° (decomp.). (Found: C, 46.25; H, 5.0; I, 27.1.

$$C_{36}H_{41}IN_4O_2S_3.HI.H_2O$$

requires C, 46.5; H, 4.8; I, 27.3%.)

The dye extends the sensitivity of a silver iodobromide photographic emulsion to 6600 A. with a maximum at 6350 A.

EXAMPLE 28. — (3-METHYL-2-BENZOTHIAZOLE)-(1,3,3-TRIMETHYL-2-INDOLENINE)β - (2-2' - HYDROXYETHYLTHIO-1-PHENYL - 3 - INDOLYL)-PENTAMETHINCYANINE IODIDE

A mixture of 3-methyl-2-[2-(1-phenyl-2-thio - 3 - indolinylidene)-propylidene]-benzothiazoline (0.85 g.), 2-bromoethanol (0.3 ml.) and chloroform (10 ml.) was refluxed for 16 hours. The product obtained by evaporation of the solution was refluxed for 15 minutes in pyridine (10 ml.) with 2-ω-acetanilidovinyl-1,3,3-trimethylindoleninium iodide (0.9 g.). Addition of aqueous potassium iodide solution caused the separation of the dye, which had M. Pt. 204–206°, by crystallisation from methanol.

EXAMPLE 29.—BIS-(3-METHYL - 2 - BENZOTHIAZOLE)β-(2-2'-HYDROXYETHYLTHIO - 1 - METHYL - 3 - INDOLYL) - PENTAMETHINCYANINE BROMIDE

A mixture of 3-methyl-2-[2-(1-methyl-2-thio - 3 - indolinylidene)-propylidene]-benzothiazoline (2.2 g.), 2-bromoethanol (0.65 ml.) and chloroform (25 ml.) was refluxed for 18 hours. The residue remaining after evaporation of the solvent was refluxed in ethanol (15 ml.) for 15 minutes with 2-ω-ethylthiovinyl-3-methylbenzothiazolium toluene-p-sulphonate (2.5 g.) and triethylamine (1.0 ml.). The solid which separated was collected and crystallised from methanol to yield the dye, M. Pt. 191–192°.

The dye imparts a new band of sensitivity to a silver iodobromide photographic emulsion from 6800 to 8500 A. with a maximum at 8100 A.

Using methods similar to those described in Examples 28 and 29, the dyes of Examples 30 to 35 were prepared. These six dyes, the data for which are collected in Table 2, all have the structure of general Formula XI:

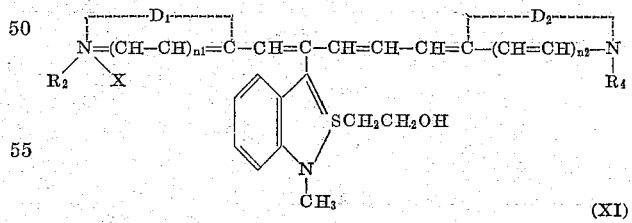

(XI)

TABLE 2

[The letter following the example number indicates the merocyanine used. The anion of the salt obtained is indicated in the column of melting point]

| Example | End Groups | | M. Pt., °C. | Sensitising A. | |
|---|---|---|---|---|---|
| | | | | Extent | Max. |
| 30A | 3-methyl-2-benzothiazole | 3-methyl-2-benzoxazole | 190–191 (I) | | |
| 31A | do | 5,6-dimethoxy-3-methyl-2-benzothiazole | 189–192 (I) | 6,900–7,800 | 7,400 |
| 32B | 3-ethyl-2-benzothiazole | 3-ethyl-2-benzothiazole | 178–181 (I) | 6,700–7,800 | 7,200 |
| 33G | 5,6-dimethoxy-3-methyl-2-benzothiazole | 1-methyl-2-quinoline | 213–214 (I) | | |
| 34G | do | 3-methyl-2-benzothiazole | 211–212 (Br) | 6,700–8,400 | 8,100 |
| 35J | 3,5-dimethyl-2-benzoselenazole | do | 149–195 (Br) | 6,800–8,300 | 8,000 |

EXAMPLE 36.—BIS - (3 - METHYL - 2 - BENZOTHIAZOLE) β - (2 - 2'-CARBOXYETHYLTHIO-1-PHENYL-3-INDOYL)-TRIMETHINCYANINE IODIDE

A mixture of 3-methyl-2-[2-(1-phenyl-2-thio-3-indolinylidene)propylidene]-benzothiazoline (1.0 g.), 3-iodopropionic acid (0.7 g.) and chloroform (20 ml.) was refluxed for one hour and then evaporated to dryness. The resulting solid and 3-methyl-2-methylthiobenzothiazolium iodide (0.7 g.) were refluxed for one hour with ethanol (20 ml.) and anhydrous sodium acetate (0.3 g.). The solid which separated on cooling was collected and crystallised from methanol containing hydriodic acid (S.G. 1.7, 0.2 ml.) to yield the dye as green crystals, M. Pt. 197–198°. (Found: C, 56.5; H, 4.2; I, 16.2; S, 12.8. $C_{36}H_{30}IN_3O_2S_3$ requires C, 56.9; H, 4.0; I, 16.7; S, 12.7%.)

The dye extends the sensitivity of a silver iodobromide photographic emulsion to 6550 A. with a maximum at 6350 A.

EXAMPLE 37.—ANHYDRO - BIS - (3 - METHYL - 2- BENZOTHIAZOLE) β - (2 - 2' - CARBOXYETHYLTHIO - 1 - PHENYL - 3 - INDOLYL)-TRIMETHINCYANINE HYDROXIDE

A solution of the product from Example 38 in methanol and chloroform (2:1) was run through an ion-exchange column ("Deacidite E"). The eluate was evaporated to dryness and the residue was crystallised from methanol to yield the dye as deep green crysetals, M. Pt. 203–204°. (Found: C, 67.5; H, 5.2; S, 14.3. $C_{36}H_{29}N_3O_2S_3 \cdot CH_4O$ requires C, 67.0; H, 5.0; S, 14.5%.)

The dye extends the sensitivity of a silver iodobromide photographic emulsion to 6550 A. with a maximum at 6350 A.

EXAMPLE 38. — ANHYDRO - BIS(6 - METHOXY-3-METHYL - 2 - BENZOTHIAZOLE) β-(1-METHYL-2-2' - SULPHOETHYLTHIO-3-INDOLYL)-TRIMETHINCYANINE HYDROXIDE

6 - methoxy-3-methyl-2-[2-(1-methyl-2-thio-3-indolinylidene)propylidene]-benzothiazoline (0.6 g.), sodium 2-iodoethanesulphonate (0.6 g.) and 2-methoxyethanol (25 ml.) were refluxed together for 3 hours, and the solution was evaporated to dryness under reduced pressure. The residue was mixed with 6-methoxy-3-methyl-2-methylthiobenzothiazolium toluene-p-sulphonate (0.7 g.) and refluxed in ethanol (20 ml.) containing triethylamine (0.4 ml.) for one hour. The solid which separated was collected and washed with hot ethanol. Crystallisation from methanol gave the dye as green crystals, M. Pt. 335–336°. (Found: C, 56.4; H, 4.5; S, 18.7. $C_{32}H_{31}N_3O_5S_4 \cdot H_2O$ requires C, 56.2; H, 4.9; S, 18.8%.)

The dye extends the sensitivity of a silver iodobromide photographic emulsion to 6150 A. with a maximum at 5600 A.

EXAMPLE 39.—BIS-(3-ETHYL-2-BENZOTHIAZOLE) β - (2 - CARBOXYMETHYLTHIO - 1 - ETHYL-3-INDOLYL)-TRIMETHINCYANINE BROMIDE

A mixture of 3-ethyl-2-[2-(1-ethyl-2-thio-3-indolinylidene)-propylidene]-benzothiazoline (1.0 g.) and bromoacetic acid (0.7 g.) in chloroform (15 ml.) was refluxed for 15 minutes. Evaporation of the solution and washing the residue with dry ether left a red solid. This was refluxed for 30 minutes in ethanol (10 ml.) with 3-ethyl-2-ethyl-thiobenzothiazolium toluene-p-sulphonate (1.0 g.) and triethylamine (0.6 ml.). The solid which separated on diluting the solution with water was collected and crystallised from ethanol. The product, M. Pt. 187–190°, was a mixture of the dye named in the title with that formed by loss of hydrogen bromide, viz. anhydro-bis-(3-ethyl-2-benzothiazole) β - (2 - carboxymethylthio-1-ethyl-3-indolyl)-trimethincyanine hydroxide.

The mixture extended the sensitivity of a silver iodobromide photographic emulsion to 6550 A. with a maximum at 6350 A.

EXAMPLE 40.—(3-ETHYL-2-BENZOTHIAZOLE)(6-ETHOXY - 3 - ETHYL - 2-BENZOTHIAZOLE) β-(2-CARBOXYMETHYLTHIO - 1 - ETHYL - 3 - INDOLYL)-TRIMETHINCYANINE IODIDE

The method of Example 39 was employed, but using 6-ethoxy-3-ethyl-2-ethylthiobenzothiazolium toluene-p-sulphonate. The product was isolated by the addition of aqueous potassium iodide solution and after crystallisation from ethanol had M. Pt. 260–263°. It consisted of a mixture of the compound named in the title and that formed by loss of hydrogen iodide, viz. anhydro-(3-ethyl-2-benzothiazole) (6-ethoxy-3-ethyl-2-benzothiazole) β-(2-carboxymethylthio-1-ethyl-3-indolyl)-trimethincyanine hydroxide.

The mixture extended the sensitivity of a silver iodobromide photographic emulsion to 6200 A. with a maximum at 6050 A.

The dyes of Examples 41 to 89 (Table 3) were prepared by methods similar to those used in Examples 38 to 40. All of these dyes possessed the structure of general Formula XII:

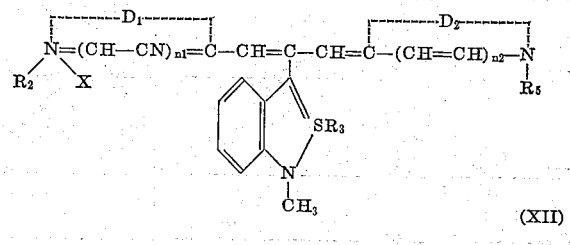

(XII)

In most cases the dye was obtained as a mixture with the compound formed from it by loss of HX. For the introduction of the various groups $R_3$, the following quaternising agents were employed:

| | |
|---|---|
| Bromoacetic acid | $R_3=-CH_2.CO_2H$ |
| 2-bromopropionic acid | $-CH\begin{subarray}{l}CH_3\\CO_2H\end{subarray}$ |
| 3-bromopropionic acid | $-CH_2.CH_2.CO_2H$ |
| 3-iodopropionic acid | $-CH_2.CH_2.CO_2H$ |
| 2-bromoisobutyric acid | $-C\begin{subarray}{l}CH_3\\CO_2H\\CH_3\end{subarray}$ |
| Sodium 2-bromoethanesulphonate | $-CH_2.CH_2.SO_3H$ |
| Sodium 2-iodoethanesulphonate | $-CH_2.CH_2.SO_3H$ |
| Sodium 4-iodobutanesulphonate | $-CH_2.CH_2.CH_2.CH_2.SO_3H$ |
| Triethylammonium 2-bromoethyl sulphate | $-CH_2.CH_2.O.SO_3H$ |

The last of these quaternising agent was prepared by fusing the triethylamine-sulphur trioxide complex

(4.5 g.) with 2-bromoethanol (1.8 ml.) at 160° for 1½ hours, cooling and washing the product several times with dry ethyl ether.

TABLE 3

[The letter following the example number indicates the merocyanine used. The anion of the salt obtained is indicated in the column of melting points]

| Example | End Groups | | $R_3$ | M.Pt., °C. | Sensitizing Å Extent | Sensitizing Å Max. |
|---|---|---|---|---|---|---|
| 41A | 3-methyl-2-benzothiazole | 3-methyl-2-benzothiazole | —$CH_2.CO_2H$ | 207–208 (Br) | 6,600 | 6,350 |
| 42A | ....do.... | ....do.... | —$CH_2.CH_2.CO_2H$ | 276–277 (I) | 6,600 | 6,350 |
| 43A | ....do.... | ....do.... | —$CH(CH_3)CO_2H$ | 202–204 (I) | 6,600 | 6,400 |
| 44A | ....do.... | ....do.... | —$C(CH_3)_2CO_2H$ | 281–282 (I) | 6,550 | 6,450 |
| 45A | ....do.... | ....do.... | —$CH_2.CH_2.SO_3H$ | 346–348 (Br) | 6,550 | 6,350 |
| 46A | ....do.... | 6-methoxy-3-methyl-2-benzothiazole | —$CH_2.CO_2H$ | 203–204 (Br) | 6,600 | 6,400 |
| 47A | ....do.... | ....do.... | —$CH_2.CH_2.CO_2H$ | 234–236 (I) | 6,650 | 6,350 |
| 48A | ....do.... | ....do.... | —$CH(CH_3)CO_2H$ | 208–210 (I) | 6,650 | 6,350 |
| 49A | ....do.... | ....do.... | —$CH_2.CH_2.SO_3H$ | 339–341 (Br) | 6,600 | 6,400 |
| 50A | ....do.... | 5,6-dimethoxy-3-methyl-2-benzothiazole | —$CH_2.CO_2H$ | 212–213 (Br) | 6,650 | 6,500 |
| 51A | ....do.... | ....do.... | —$CH(CH_3)CO_2H$ | 208–209 (I) | 6,700 | 6,400 |
| 52A | ....do.... | ....do.... | —$C(CH_3)_2CO_2H$ | 215–218 (I) | 6,600 | 6,400 |
| 53A | ....do.... | ....do.... | —$CH_2.CH_2.SO_3H$ | 269–270 (Br) | 6,750 | 6,500 |
| 54A | ....do.... | ....do.... | —$CH_2.CH_2.OSO_3H$ | 229–230 (Br) | 6,700 | 6,500 |
| 55B | 3-ethyl-2-benzothiazole | 3-ethyl-2-benzothiazole | —$CH_2.CH_2.CO_2H$ | 220–223 (I) | 6,450 | 6,350 |
| 56B | ....do.... | 5,6-dimethoxy-3-methyl-2-benzothiazole | —$CH_2.CH_2.CO_2H$ | 192–194 (I) | 6,650 | 6,350 |
| 57B | ....do.... | 3-ethyl-5,6-dimethoxy-2-benzothiazole | —$CH_2.CH_2.CO_2H$ | 154–156 ($ClO_4$) | 6,500 | 6,150 |
| 58B | ....do.... | 3-methyl-5,6-methylenedioxy-2-benzothiazole | —$CH_2.CH_2.CO_2H$ | 222–226 (I) | 6,650 | 6,300 |
| 59B | ....do.... | 3-ethyl-5,6-methylenedioxy-2-benzothiazole | —$CH_2.CH_2.CO_2H$ | 191–193 ($ClO_4$) | 6,550 | 6,200 |
| 60D | 5-chloro-3-methyl-2-benzothiazole | 5-chloro-3-methyl-2-benzothiazole | —$CH_2.CO_2H$ | 275–278 (Br) | 6,450 | 6,350 |
| 61D | ....do.... | ....do.... | —$CH_2.CH_2.CO_2H$ | 220–224 (I) | 6,550 | 6,350 |
| 62D | ....do.... | ....do.... | —$CH_2.CH_2.SO_3H$ | 327–329 (I) | 6,450 | 6,350 |
| 63E | 5-methoxy-3-methyl-2-benzothiazole | 5-methoxy-3-methyl-2-benzothiazole | —$CH_2.CH_2.CO_2H$ | 266–267 (I) | 6,800 | 6,600 |
| 64E | ....do.... | ....do.... | —$CH_2.CH_2.SO_3H$ | 359–360 (I) | 6,700 | 6,550 |
| 65E | ....do.... | ....do.... | —$CH_2.CH_2.OSO_3H$ | 280–281 (I) | 6,750 | 6,550 |
| 66F | 6-methoxy-3-methyl-2-benzothiazole | 6-methoxy-3-methyl-2-benzothiazole | —$CH_2.CH_2.CO_2H$ | 188–191 (I) | 6,700 | 6,250 |
| 67G | 5,6-dimethoxy-3-methyl-2-benzothiazole | 3-methyl-2-benzothiazole | —$CH_2.CH_2.CH_2.CH_2.SO_3H$ | 255–258 ($ClO_4$) | 6,650 | 6,500 |
| 68G | ....do.... | 5,6-dimethoxy-3-methyl-2-benzothiazole | —$CH_2.CO_2H$ | 239–240 (Br) | 6,800 | 6,600 |
| 69G | ....do.... | ....do.... | —$CH_2.CH_2.CO_2H$ | 200–202 (Br) | 6,850 | 6,600 |
| 70G | ....do.... | ....do.... | —$CH_2.CH_2.SO_3H$ | 354–355 (Br) | 6,650 | 6,450 |
| 71G | ....do.... | ....do.... | —$CH_2.CH_2.CH_2.CH_2.SO_3H$ | 185–187 ($ClO_4$) | 6,750 | 6,600 |
| 72G | ....do.... | ....do.... | —$CH_2.CH_2.OSO_3H$ | 272–273 (I) | 7,000 | 6,800 |
| 73H | 3-ethyl-5,6-dimethoxy-2-benzothiazole | 3-methyl-2-benzothiazole | —$CH_2.CH_2.BO_2H$ | 197–199 ($ClO_4$) | 6,700 | 6,350 |
| 74H | ....do.... | 5,6-dimethoxy-3-methyl-2-benzothiazole | —$CH_2.CH_2.CO_2H$ | 203–206 ($ClO_4$) | 6,850 | 6,550 |
| 75H | ....do.... | ....do.... | —$CH_2.CH_2.SO_3H$ | 264–266 (I) | 6,850 | 6,550 |
| 76H | ....do.... | 3-ethyl-5,6-dimethoxy-2-benzothiazole | —$CH_2.CH_2.CO_2H$ | 160–164 ($ClO_4$) | 6,650 | 6,350 |
| 77H | ....do.... | ....do.... | —$CH_2.CH_2.SO_3H$ | 246–250 ($ClO_4$) | 6,500 | 6,300 |
| 78I | 3-2'-hydroxyethyl-2-benzothiazole | 3-methyl-2-benzothiazole | —$CH_2.CH_2.CO_2H$ | 252–256 (I) | 6,500 | 6,350 |
| 79I | ....do.... | ....do.... | —$CH_2.CH_2.SO_3H$ | 323–325 (I) | 6,450 | 6,300 |

TABLE 3—Continued

[The letter following the example number indicates the merocyanine used. The anion of the salt obtained is indicated in the column of melting points]

| Example | End Groups | | $R_3$ | M.Pt., °C. | Sensitizing Å | |
|---|---|---|---|---|---|---|
| | | | | | Extent | Max. |
| 80I | do | 5,6-dimethoxy-3-methyl-2-benzothiazole. | —$CH_2.CH_2.CO_2H$ | 188–190 (I) | 6,450 | 6,200 |
| 81I | do | do | —$CH_2.CH_2.SO_3H$ | 271–273 (I) | 6,550 | 6,250 |
| 82J | 3,5-dimethyl-2-benzoselenazole | 3-methyl-2-benzothiazole | —$CH_2.CO_2H$ | 216–218 (I) | 6,500 | 6,350 |
| 83J | do | do | —$CH_2.CH_2.CO_2H$ | 203–204 (I) | 6,550 | 6,300 |
| 84J | do | 5-chloro-3-methyl-2-benzothiazole | —$CH_2.CH_2.CO_2H$ | 198–200 (I) | 6,450 | 6,300 |
| 85J | do | 5,6-dimethoxy-3-methyl-2-benzothiazole. | —$CH_2.CO_2H$ | 222–224 (I) | 6,750 | 6,450 |
| 86J | do | do | —$CH_2.CH_2.CO_2H$ | 198–200 (I) | 6,700 | 6,450 |
| 87J | do | do | —$CH_2.CH_2.SO_3H$ | 242–245 (I) | 6,700 | 6,500 |
| 88K | 3-ethyl-5-methyl-2-benzoselenazole | 5-chloro-3-ethyl-2-benzothiazole | —$CH_2.CH_2.CO_2H$ | 177–180 (I) | 6,400 | |
| 89K | do | 3-ethyl-5,6-dimethoxy-2-benzothiazole. | —$CH_2.CH_2.CO_2H$ | 185–187 (I) | 6,500 | 6,200 |

EXAMPLE 90.—BIS - (3 - METHYL-2-BENZOTHIAZOLE) β(2-2'-CARBOXYETHYLTHIO-1-METHYL-3-INDOLYL)-PENTAMETHINCYANINE IODIDE

A mixture of 3-methyl-2-[2-(1-methyl-2-thio-3-indolinylidene)-propylidene]-benzothiazoline (0.9 g.) and 3-bromopropionic acid (0.7 g.) was refluxed in chloroform (20 ml.) for 16 hours. The product obtained by evaporation of the solution to dryness was refluxed for 15 minutes in ethanol (10 ml.) with 2-ω-ethylthiovinyl-3-methylbenzothiazolium toluene-p-sulphonate (1.0 g.) and triethylamine (0.4 ml.) Addition of aqueous potassium iodide solution caused the separation of the dye, which formed deep purple crystals M. Pt. 182–183° by crystallisation from methanol.

The dye imparts a new band of sensitivity to a silver iodobromide photographic emulsion from 6600 to 8600 A., with maxima at 7200 and 8300 A.

EXAMPLE 91.—(5,6 - DIMETHOXY - 3-METHYL-2-BENZOTHIAZOLE)(3 - METHYL - 2-BENZOTHIAZOLE) β-(2-2'-CARBOXYETHYLTHIO-1-METHYL-3-INDOLYL)-PENTAMETHINCYANINE IODIDE

The dye was prepared as in Example 90, but using 5,6-dimethoxy- -3 - methyl-2-[2-(1-methyl-2-thio-3-indolinylidene)-propylidene]-benzothiazoline. The dye formed green crystals, M. Pt. 255–256°, by crystallisation from methanol.

The dye imparts a new band of sensitivity to a silver iodobromide photographic emulsion from 6400 to 8500 A. with a maximum at 8050 A.

EXAMPLE 92.—BIS - (3 - METHYL-2-BENZOTHIAZOLE) β-(1-METHYL-2,2'-SULPHOETHYLTHIO-3-INDOLYL)-PENTAMETHINCYANINE BROMIDE

A mixture of 3-methyl-2-[2-(1-methyl-2-thio-3-indolinylidene)-propylidene]-benzothiazoline (0.9 g.), sodium 2-bromoethanesulphonate (0.9 g.) and 2-methoxyethanol (20 ml.) was refluxed for 24 hours. The solvent was removed under reduced pressure, and the residue and 2-ω-ethylthiovinyl-3-methylbenzothiazolium toluene-p-sulphonate (1.0 g.) were refluxed together in ethanol (10 ml.) containing triethylamine (0.4 ml.) for 15 minutes. The solid which separated was collected and crystallised from ethanol to yield the dye as green crystals, M. Pt. 219–220°.

The dye imparts a new band of sensitivity to a silver iodobromide photographic emulsion from 6700 to 8600 A. with a maximum at 8100 A.

EXAMPLE 93.—(3,4 - DIMETHYL-2-THIAZOLE)(3-METHYL-2-BENZOTHIAZOLE) β-(2-2'-METHOXY - CARBONYLETHYLTHIO-1-METHYL-3-INDOLYL)-TRIMETHINCYANINE PERCHOLRATE

A mixture of 3,4 dimethyl-2-methylthiothiazolium toluene-p-sulphonate (3.35 g.), 3-isopropylidene-methylindolin-2-thione (2.0 g.), ethanol (20 ml.) and triethylamine (1.5 ml.) was refluxed for 2 hours. The solid which separated was collected and washed successively with hot ethanol and hot acetone; 3,4-dimethyl-2-[2-(1-methyl - 2 - thio-3-indolinylidene)-propylidene]-Δ²-thiazoline formed yellow-brown crystals, M. Pt. 212–213° by crystallisation from 2-methoxyethanol. This compound (0.68 g.), methyl-3-iodopropionate (0.6 g.) and chloroform (25 ml.) were refluxed together for 30 minutes. The solid obtained on evaporation of the solvent was refluxed for one hour in ethanol (20 ml.) with 3 - methyl - 2-methylthiobenzothiazolium toluene-p-sulphonate (0.9 g.) and triethylamine (0.4 ml.) An aqueous sodium perchlorate solution was added, the dye was extracted with chloroform, and the solution was chromatographed on an alumina column. The main purple band was eluted, the eluate was evaporated, and the resulting solid was washed with light petroleum, to yield the dye, M. Pt. 112–114°.

The dye extends the sensitivity of a silver iodobromide photographic emulsion to 6800 A. with a maximum at 6400 A.

EXAMPLE 94.—[3 - METHYLNAPHTHO-(1',2':4,5)-THIAZOLE-](5,6 - DIMETHOXY - 3 - METHYL-2-BENZOTHIAZOLE) β-(2-2' - HYDROXYETHYL - THIO - 1-METHYL-3-INDOLYL)-TRIMETHINCYANINE BROMIDE

A mixture of 2-methylthio-β-naphthothiazole (2.3 g.) and methyl toluene-p-sulphonate (1.9 g.) was fused at 160° for 30 minutes. The resulting quaternary salt was refluxed for 45 minutes with 3-isopropylidene-1-methylindolin-2-thione (2.0 g.), ethanol (20 ml.) and triethylamine (2.0 ml.) The solid which separated was collected and washed with boiling methanol; 3-methyl-2-[2 - (1 - methyl-2-thio-3-indolinylidene)-propylidene]-naphtho-(1',2':4,5) - thiazoline formed bronze-coloured crystals, M. Pt. 298–299° by crystallisation from pyridine. This material (1.4 g.), 2-bromethanol (0.3 ml.) and chloroform (10 ml.) were refluxed together for 20 hours, and the solution was evaporated to dryness. The product and 5,6-dimethoxy-3-methyl-2-methylthiobenzothiazolium toluene-p-sulphonate (3.0 g.) were refluxed together in ethanol (20 ml.) containing triethylamine (1.0 ml.) for 30 minutes. Addition of aqueous potassium bromide solution caused the separation of the dye, which formed deep purple crystals, M. Pt. 238–239°, by boiling out with methanol.

The dye extends the sensitivity of a silver iodobromide photographic emulsion to 6900 A. with maxima at 6300 and 6700 A.

EXAMPLE 95.—(3 - METHYL-2-BENZOTHIAZOLE) (5,6 - DIMETHOXY - 3-METHYL-2-BENZOTHIAZOLE) $\beta$ - (2-2'-HYDROXYETHYLTHIO-1-METHYL - 3 - INDOLYL)-α-METHYLTRIMETHINCYANINE IODIDE A mixture of 2-ethylbenzothiazole (3.3 g.) and methyl toluene-p-sulphonate (3.8 g.) was fused at 100° for 3 hours. The product was refluxed in pyridine (20 ml.) with 1-methylindolin-2-thione (3.3 g.) and ethyl orthoacetate (5.0 ml.) for 30 minutes. The product which separated was collected and washed with hot ethanol; 3-methyl - 2 - [1 - methyl - 2-(1-methyl-2-thio-3-indolinylidene)-propylidene]benzothiazoline formed green crystals, M. Pt. 257–259°, by crystallisation from methanol. This material (0.35 g.), 2-bromethanol (0.2 ml.) and chloroform (25 ml.) were refluxed together for 24 hours, and the solution was evaporated to dryness. The product and 5,6-dimethoxy-3-methyl-2-methylthiobenzothiazolium toluene-p-sulphonate (0.45 g.) were refluxed in ethanol (20 ml.) containing triethylamine (0.2 ml.) for 45 minutes. Addition of aqueous potassium iodide solution caused the separation of the dye, which formed deep blue crystals, M. Pt. 208–211°, by crystallisation from methanol.

The dye extends the sensitivity of a silver iodobromide photographic emulsion to 6500 A. with a maximum at 6300 A.

EXAMPLE 96. — (3-METHYL-2-BENZOTHIAZOLE)- (6 - METHOXY-3-METHYL-2-BENZOTHIAZOLE)- $\beta$ - (2-2'-CARBOXYETHYLTHIO - 5 - METHOXY-1-METHYL - 3 - INDOLYL) - TRIMETHINCYANINE PERCHLORATE A mixture of 2,3-dimethylbenzothiazolium toluene-p-sulphonate (1.7 g.), 5-methoxy-1-methylindolin-2-thione (0.95 g.), pyridine (10 ml.) and ethyl orthocetate (1.8 ml.) was refluxed for 20 minutes, and the mixture was poured into ethanol. The solid which separated (0.6 g.) was refluxed with 3-bromopropionic acid (0.5 g.) in 2-methoxyethanol (10 ml.) for 2½ hours. Evaporation of the solvent under reduced pressure left a red solid which was refluxed for 30 minutes in ethanol (10 ml.) with 6-methoxy-3-methyl-2-methyl-thiobenzothiazolium toluene-p-sulphonate (1.0 g.) and triethylamine (0.5 ml.). Addition of aqueous sodium perchlorate solution caused the separation of the dye, which formed bronze-coloured crystals, M.Pt. 175–176°, from methanol.

The dye extended the sensitivity of a silver iodobromide photographic emulsion to 6450 A. with a maximum at 6250 A.

EXAMPLE 97. — (3-METHYL-2-BENZOTHIAZOLE)- (5,6 - DIMETHOXY - 3 - METHYL-2-BENZOTHIAZOLE)$\beta$ - (2 - 2' - CARBOXYETHYLTHIO - 5 - METHOXY - 1 - METHYL-4-INDOLYL)-TRIMETHINCYANINE PERCHLORATE The dye was prepared similarly to Example 96, and formed purple-brown crystals, M.Pt. 164–165°, by crystallisation from methanol.

The dye extended the sensitivity of a silver iodobromide photographic emulsion to 6700 A. with a maximum at 6550 A.

What I claim is:
1. A cyanine dye selected from the group consisting of (A) a dye of the formula

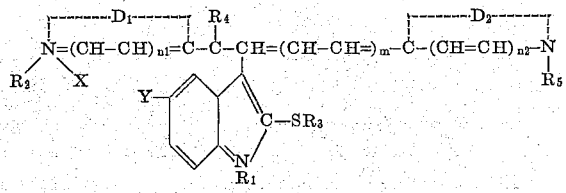

wherein $R_1$ is selected from the class consisting of alkyl and aryl, $R_3$ is alkylene-X wherein X is selected from the group consisting of —COOH, —$SO_3H$, —$OSO_3H$, —OH, lower alkoxy, alkanoyloxy, lower alkoxycarbonyl, —CN, amino, lower alkyl amino and carbomyl, $R_4$ is selected from the class consisting of hydrogen and alkyl, $R_2$ and $R_5$ are each selected from the class consisting of alkyl, hydroxyalkyl where the alkyl moiety contains 1 to 6 carbon atoms and aralkyl where the alkyl moiety contains 1 to 6 carbon atoms, $m$, $n_1$ and $n_2$ are each selected from nought and one, X is an acid radical, Y is selected from the class consisting of hydrogen and lower alkoxy and $D_1$ and $D_2$ each represent the atoms necessary to complete the heterocyclic nucleus selected from the group consisting of a thiazole nucleus, benzothiazole nucleus, naphthothiazole nucleus, benzoxazole nucleus, naphthoxazole nucleus, benzoselenazole nucleus, pyridine nucleus, quinoline nucleus, α-naphthoquinoline nucleus, β-naphthoquinoline nucleus, indolenine nucleus, diazole nucleus, thiazoline nucleus and diazine nucleus; (B) corresponding dyes of the said formula but in which the X radical in a hydrogen atom of an acid group contained in $R_3$ are eliminated; and (C) corresponding acid addition salts of those of the said dyes in which $R_3$ carries an amino group.

2. Bis-(3 methyl-2-benzothiazole)$\beta$-(2-2'-hydroxyethylthio-1-methyl-3-indolyl)-trimethincyanine bromide.

3. (3-methyl - 2 - benzothiazole) (5,6 - dimethoxy-3-methyl-2-benzothiazole)$\beta$ -(2-cyanomethylthio-1-methyl-3 indolyl)-trimethincyanine iodide.

4. Bis-(3-methyl-2-benzothiazole)-$\beta$(2-2'-hydroxyethylthio-1-phenyl-3-indolyl)-trimethincyanine bromide.

5. Bis-(5-methoxy-3-methyl-2-benzothiazole)$\beta$-(2-2'-diethylaminoethylthio-1-methyl-3-indolyl)-trimethincyanine iodide.

6. Anhydro-bis-(3 - methyl-2-benzothiazole)$\beta$-(2-2'-carboxyethylthio - 1 - phenyl-3-indolyl)-trimethincyanine hydroxide.

7. Anhydro-bis (6-methoxy-3-methyl-2-benzothiazole)-$\beta$-(1-methyl-2-2'-sulphoethylthio-3-indolyl)-trimethincyanine hydroxide.

8. (3,4 - dimethyl - 2 - thiazole) (3-methyl-2-benzothiazole)$\beta$-(2-2'-methoxy carbonylethylthio - 1 - methyl-3-indolyl)-trimethincyanine perchlorate.

9. Bis - (3-methyl-2-benzothiazole)$\beta$-(2-2'carboxyethylthio-1-methyl-3-indolyl)-pentamethincyanine iodide.

10. (3-methyl-2-benzothiazole) (5,6-dimethoxy-3-methyl-2-benzothiazole)$\beta$-(1-methyl-2-2'-sulphoethylthio-3-indolyl)-trimethincyanine bromide.

11. Bis-(5,6-dimethoxy-3-methyl-2-benzothiazole)$\beta$-(2-2' - carbamoyl-ethylthio-1-methyl-3-indolyl) trimethincyanine iodide.

References Cited by the Examiner
UNITED STATES PATENTS

| | | | |
|---|---|---|---|
| 2,666,761 | 1/54 | Heseltine et al. | 260—240.1 |
| 2,921,067 | 1/60 | Larive et al. | 260—240.65 |
| 2,961,318 | 11/60 | Jones | 96—104 |

(Other references on following page)

FOREIGN PATENTS 845,588  8/60  Great Britain.

OTHER REFERENCES

Venkataraman: "The Chemistry of Synthetic Dyes," volume II, pages 1153, 1166 and 1185 to 1186, Academic Press Inc., 1952 (New York).

Welch et al.: Science, volume 105, pages 486–488 (1947).

Peters et al.: J. Pharm. and Exptl. Therapy, volume 95, pages 212, 215 to 217 and 232 to 233 (1949).

IRVING MARCUS, *Primary Examiner.*

J. D. RANDOLPH, WALTER A. MODANCE,
*Examiners.*